Oct. 22, 1957  E. A. TROXELL  2,810,458
AUXILIARY BRAKING DEVICE
Filed Jan. 25, 1956
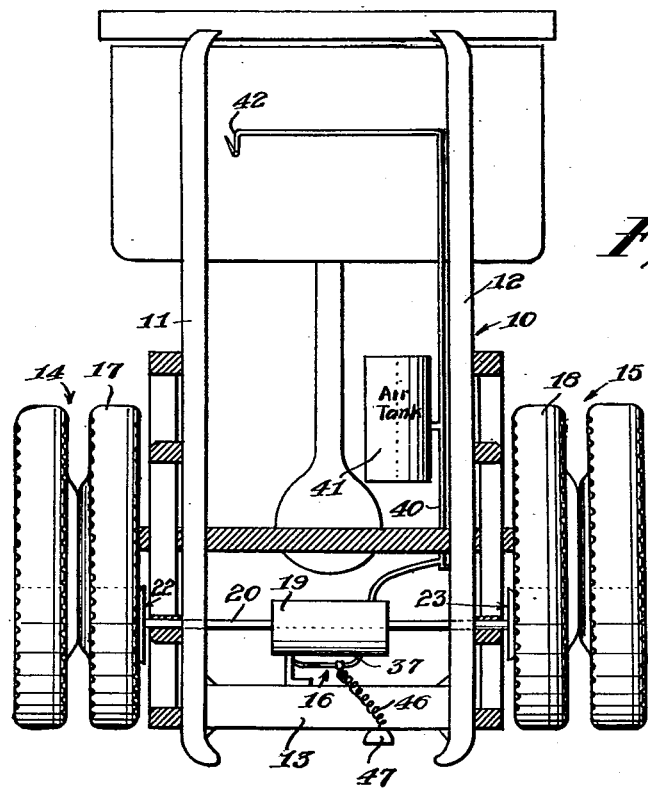
Fig. 1.
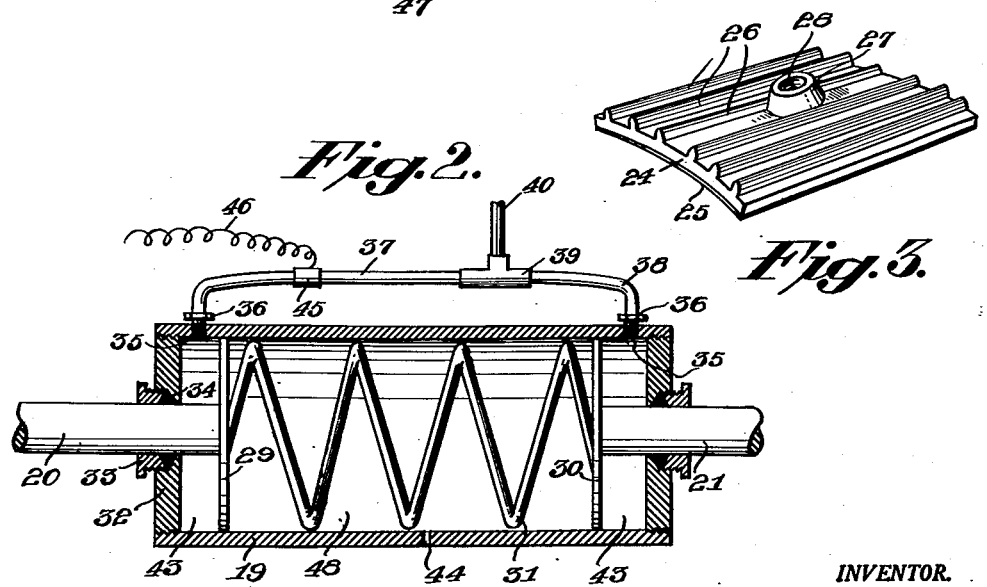
Fig. 2.
Fig. 3.
INVENTOR.
Everett A. Troxell
BY

United States Patent Office

2,810,458
Patented Oct. 22, 1957

---

2,810,458

AUXILIARY BRAKING DEVICE

Everett A. Troxell, Bethlehem, Pa.

Application January 25, 1956, Serial No. 561,255

4 Claims. (Cl. 188—2)

This invention relates to a safety device for vehicles and pertains more particularly to an auxiliary braking device for emergency use.

With trucks and heavily laden vehicles, the danger of brake failure, particularly in hilly terrain, is a constant hazard. The brake failure can be occasioned by a mechanical defect in the brake system itself or a too frequent application, or an overly prolonged application of the vehicle brakes can cause a phenomenon usually referred to as a "brake fade." In any case, it is desirable to provide an auxiliary braking system or device which can be either manually or automatically brought into operation should brake failure due to any cause occur. The conventional parking brake employed on all vehicles, and which is normally referred to as an emergency brake, is not intended for nor is it adapted for use in an emergency situation since the parking brake is designed only for holding the vehicle against moving when the vehicle is at a standstill, it being well known, especially by truckers, that using the parking brake for the purpose of stopping a runaway vehicle, particularly on a down grade, is to no advantage because the parking brake will burn out in a very short period of time without having any appreciable braking effect on the vehicle.

It is, therefore, an object of this invention to provide an auxiliary braking device for vehicles, particularly trucks and/or trailers, which may be applied in the case of brake failure.

It is another object of this invention to provide an auxiliary braking device which is automatically engaged due to the loss of air pressure or vacuum, which ever may be used, in the brake system.

Still another object of this invention is to provide a device of the character described which incorporates a minimum of parts, which is economical in structure and which is easily applied to existing vehicles.

A still further object of this invention is to provide an auxiliary braking device which incorporates a double ended cylinder having associated therewith two piston assemblies which operate directly to apply the auxiliary braking device and which are urged toward such braking position by means of a spring device, the pistons normally being held in inoperative position by the compressed air or vacuum used for applying the conventional vehicle brakes.

Still another object of the invention is to provide a braking system in conformity with the preceding object wherein the cylinder is mounted transversely between and in opposed relation to a pair of road wheels and wherein the free ends of the piston members carry brake shoes rigidly therewith for direct application against the inner side wall portions of the tires.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts through the several figures and in which:

Figure 1 is a diagrammatical plan view of a vehicle chassis showing the improved auxiliary braking device operatively positioned thereon;

Figure 2 is an enlarged longitudinal section through the piston and cylinder assembly, and Figure 3 is a perspective view of one of the brake shoes.

Referring more particularly to Figure 1, there is diagrammatically shown therein a vehicle chassis 10 which includes the usual spaced parallel side numbers 11 and 12 interconnected by the usual cross-frame members, one of which is indicated by the reference character 13. The particular vehicle shown in Figure 1 is a truck, usually referred to as a tractor, used for towing a semitrailer, the tractor and semitrailer being coupled by the conventional fifth wheel assembly. As is usual in vehicles of this type, the driving wheels embody dual wheel assemblies 14 and 15. The auxiliary braking device 16 is adapted to operate on the inner side wall portion of the two inside tires 17 and 18 of the respective dual wheel assemblies.

The auxiliary brake assembly 16, as shown in Fig. 2, includes a cylinder 19 within which are operable a pair of piston members 29 and 30 and which are respectively connected to a pair of piston rods 20 and 21 longitudinally movable through opposite ends of the cylinder 19 in opposite directions in response to conditions existing within the cylinder 19.

Rigidly attached to the outer or free ends of the piston rods 20 and 21 are brake shoe members 22 and 23 which are engageable with the inner side wall portions of the two previously mentioned tires 17 and 18 respectively. Each brake shoe is constructed generally as shown in Figure 3 and includes a main plate like body portion 24 having a concave inner surface 25 adapted to conform to the shape of the tire side wall, and is provided on its outer surface with a plurality of cooling ribs 26 for the purpose of dispelling heat produced during emergency braking operations. Each shoe is also provided on its outer side with an upraised boss 27 having a central opening 28 therein for the reception of and rigid attachment to the free end of the corresponding piston rods 20 and 21. Preferably, the brake shoes are constructed of aluminum or similar metal having good heat conductivity.

The cylinder 19 is rigidly attached to the vehicle chassis by either mounting it directly upon one of the various cross-frame members or by attaching it by means of brackets to such a cross member. The cylinder must, of course, be so located on the chassis with respect to the inner surfaces of the tires 17 and 18 that the brake shoes will engage therewith when the vehicle is ladened. By so mounting the cylinder, the installation of the device is rendered very simple and the component parts of the auxiliary braking devices are reduced to a minimum since the free ends of the piston rods 20 and 21 act directly upon the inner surfaces of the tires 17 and 18 through the medium of the brake shoes 22 and 23.

Although the device is intended for use with conventional tires, it is preferred that the device be used in conjunction with specially constructed tires incorporating a tread on the inner side wall thereof against which the brake shoes operate to increase the coefficient of friction therebetween. For this purpose, the inner surfaces of the brake shoes may themselves be provided with a tread or irregularities such as knobs, ribs, knurling or the like.

The construction of the cylinder assembly is shown more clearly in Figure 2, and it will be noted therein that each of the piston rods 20 and 21 is rigidly attached at its inner end to the respective piston members 29 and 30. Disposed between the opposing faces of the piston members 29 and 30 is a compression spring 31 which is capable of exerting sufficient force to spread the pistons apart and effect a powerful braking force between the brake shoes 22 and 23 and the respective tires 17 and 18. The opposite ends of the cylinder 19 are open as shown and internally threaded to receive the annular cover members 32, each of which is provided with a central opening through which a piston rod projects. Each of such openings is counterbored as shown, and internally threaded to receive the sealing plug 33, the counter bore and associated end of the sealing plug presenting frusto conical surfaces in opposed relation within which a ring of deformable sealing material 34 is disposed as shown. By tightening down the sealing plug 33, the material 34 is deformed tightly into engagement with the outer surfaces of the respective piston rods 20 or 21.

Adjacent the inner surface of each cover member 32, is provided a threaded opening 35 through the cylinder 19 into which a fitting member 36 is engaged, the fittings being interconnected by means of tubing sections 37 and 38, joined by the T fitting 39 to the slave line 40. The slave line extends to the conventional air reservoir 41 which normally holds a supply of compressed air for the conventional vehicle brakes. The slave line 40 not only extends to the reservoir 41 but also up to emergency valve 42 in the vehicle cab, the purpose of which will be presently described.

The auxiliary braking system is so designed that compressed air under sufficient pressure operating within the spaces 43 between the covers 32 and pistons 29 and 30 will be sufficient to overcome the compression spring 31 and move the brake shoes out of engagement with the tires. For example, with a conventional brake system having a normal operating pressure of 75 p. s. i., some arbitrary lower limit of operating pressure within the reservoir 41, for example, 55 p. s. i., is chosen below which the pressure will be sufficient to overcome the compression spring 31 and will permit the auxiliary braking device to operate. Thus, should a brake line fail or should the air compressing device fail to operate, the auxiliary brake device will automatically come into operation when the reserve pressure has fallen below the predetermined lower limit.

For the purpose of permitting the assembly to "breathe," an atmospheric vent 44 is provided in the cylinder 19 between the opposed pistons 29 and 30. Also, it is desirable to provide in the air line, such as in the section 37, a switch 45 which will be closed when the air pressure falls below the lower limit to connect the wire 46 leading to the vehicle stop light 47 to the electrical system of the vehicle.

The emergency valve 42 in the vehicle cab is provided to permit the operator to throw the auxiliary device into operation at will. The necessity for this would be occasioned, for example, under circumstances of severe "brake fade" resulting from the conventional brake linings becoming too hot due to prolonged use. In the specific system shown in Figure 1, opening of the emergency valve 42 would, of course, permit the air in the reservoir tank 41 to escape and, consequently, after application of the auxiliary device by this means, it would be necessary to again build up the supply in the reservoir before the conventional brakes could operate. However, it is proposed that the emergency valve 42 be disposed within the line 40 between the reservoir and the auxiliary device and operated by a control in the vehicle cab and of such a nature that when operated, the emergency valve would simultaneously disestablish connection between the reservoir and the auxiliary device and vent the line leading to the auxiliary device, thus causing its operation.

The auxiliary device shown in Figure 2, can be applied to a system having slave vacuum units by merely connecting the slave line 40 directly to the vent opening 44 and permitting the apertures 35 to then operate as vents. With this connection, the reduced pressure produced between the opposed pistons 29 and 30 in the region 48 would tend to move the pistons toward each other and compress the spring 31 and move the brake shoes to inoperable positions as long as a sufficient vacuum exists in the conventional brake system.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. An auxiliary brake for wheel-supported vehicles having an elongate frame and a pneumatic brake system, comprising a double ended cylinder mounted on said frame in transverse relation thereto and in opposed relation to one pair of wheels, a pair of pistons slidably mounted in said cylinder, spring means acting between said pistons and normally urging them apart, a piston rod connected to each piston extending outwardly through an associated end of the cylinder, a brake shoe on the free end of each piston rod for engaging the tire of the respective wheel of said pair, and conduit means connecting said cylinder with said pneumatic brake system for normally urging said pistons toward each other.

2. An auxiliary brake for wheel-supported vehicles having an elongate frame and a pneumatic brake system, comprising a double ended cylinder mounted on said frame in transverse relation thereto and in opposed relation to one pair of wheels, a pair of pistons slidably mounted in said cylinder, spring means acting between said pistons and normally urging them apart, a piston rod connected to each piston extending outwardly through an associated end of the cylinder, a brake shoe on the free end of each piston rod for engaging the tire of the respective wheel of said pair, conduit means connecting said cylinder with said pneumatic brake system for normally urging said pistons toward each other, and switch means interposed in said conduit means for connection to a brake light on the vehicle.

3. An auxiliary brake for wheel-supported vehicles having an elongate frame and a pneumatic brake system, comprising a double ended cylinder mounted on said frame in transverse relation thereto and in opposed relation to one pair of wheels, a pair of pistons slidably mounted in said cylinder, spring means acting between said pistons and normally urging them apart, a piston rod connected to each piston extending outwardly through an associated end of the cylinder, a brake shoe on the free end of each piston rod for engaging the tire of the respective wheel of said pair, conduit means connecting said cylinder with said pneumatic brake system for normally urging said pistons toward each other, and manually operable valve means for venting said conduit means.

4. An auxiliary brake for wheel-supported vehicles having an elongate frame and a pneumatic brake system, comprising a double ended cylinder mounted on said frame in transverse relation thereto and in opposed relation to one pair of wheels, a pair of pistons slidably mounted in said cylinder, spring means acting between said pistons and normally urging them apart, a piston rod connected to each piston extending outwardly through an associated end of the cylinder, a brake shoe on the free end of each piston rod for engaging the tire of the respective wheel of said pair, conduit means connecting said cylinder with said pneumatic brake system for normally urging said pistons toward each other, said brake shoes being formed of aluminum and having a concave inner tire-engaging surface and a ribbed outer surface.

References Cited in the file of this patent

UNITED STATES PATENTS

| | | |
|---|---|---|
| 2,126,849 | Weiss | Aug. 16, 1938 |
| 2,396,153 | Butler | Mar. 5, 1946 |
| 2,720,293 | Brinkmeyer | Oct. 11, 1955 |